April 21, 1925.
J. VANORIO
1,535,081
APPARATUS FOR HEATING WATER OR OTHER LIQUIDS
Filed May 24, 1919  2 Sheets-Sheet 2
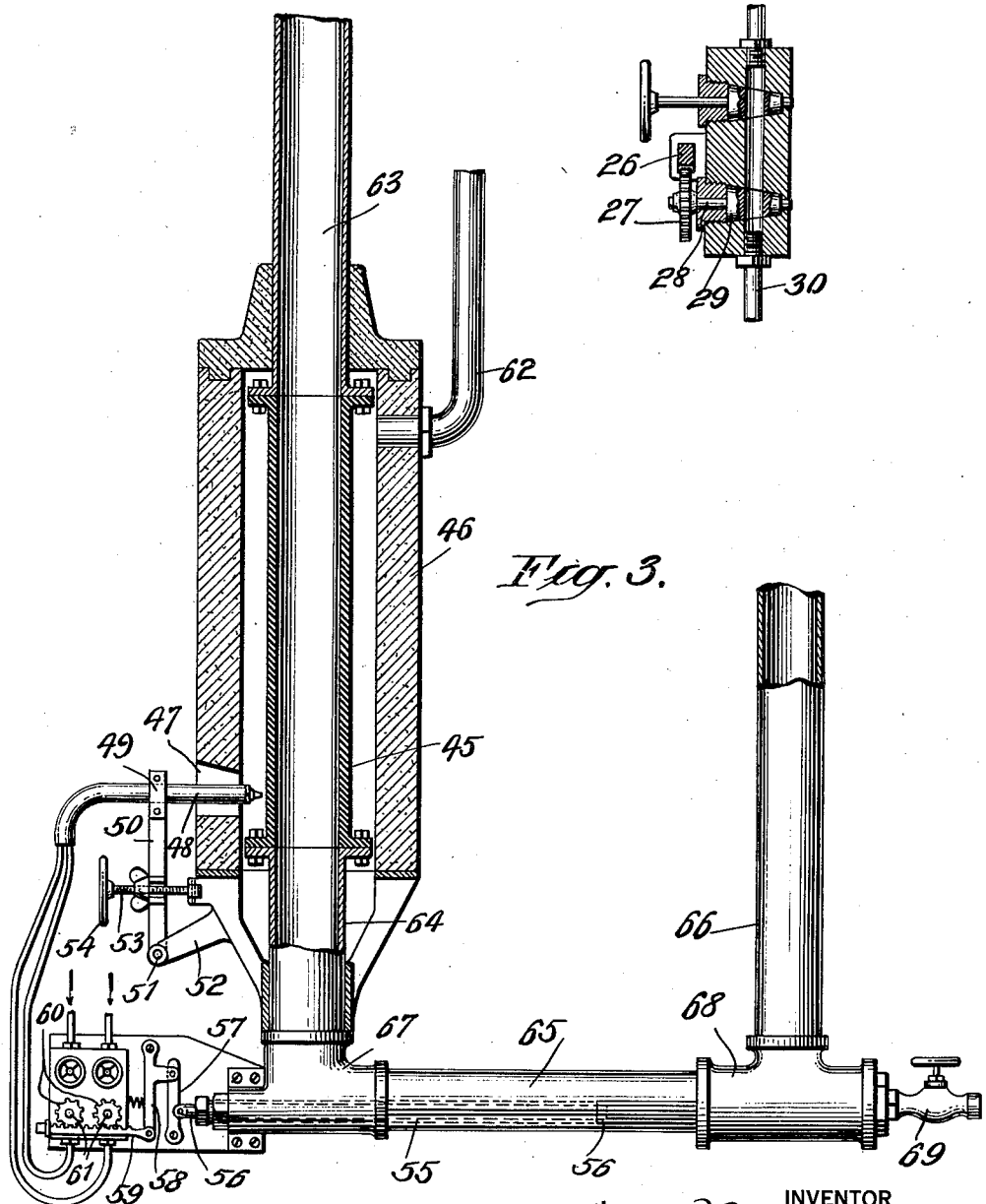

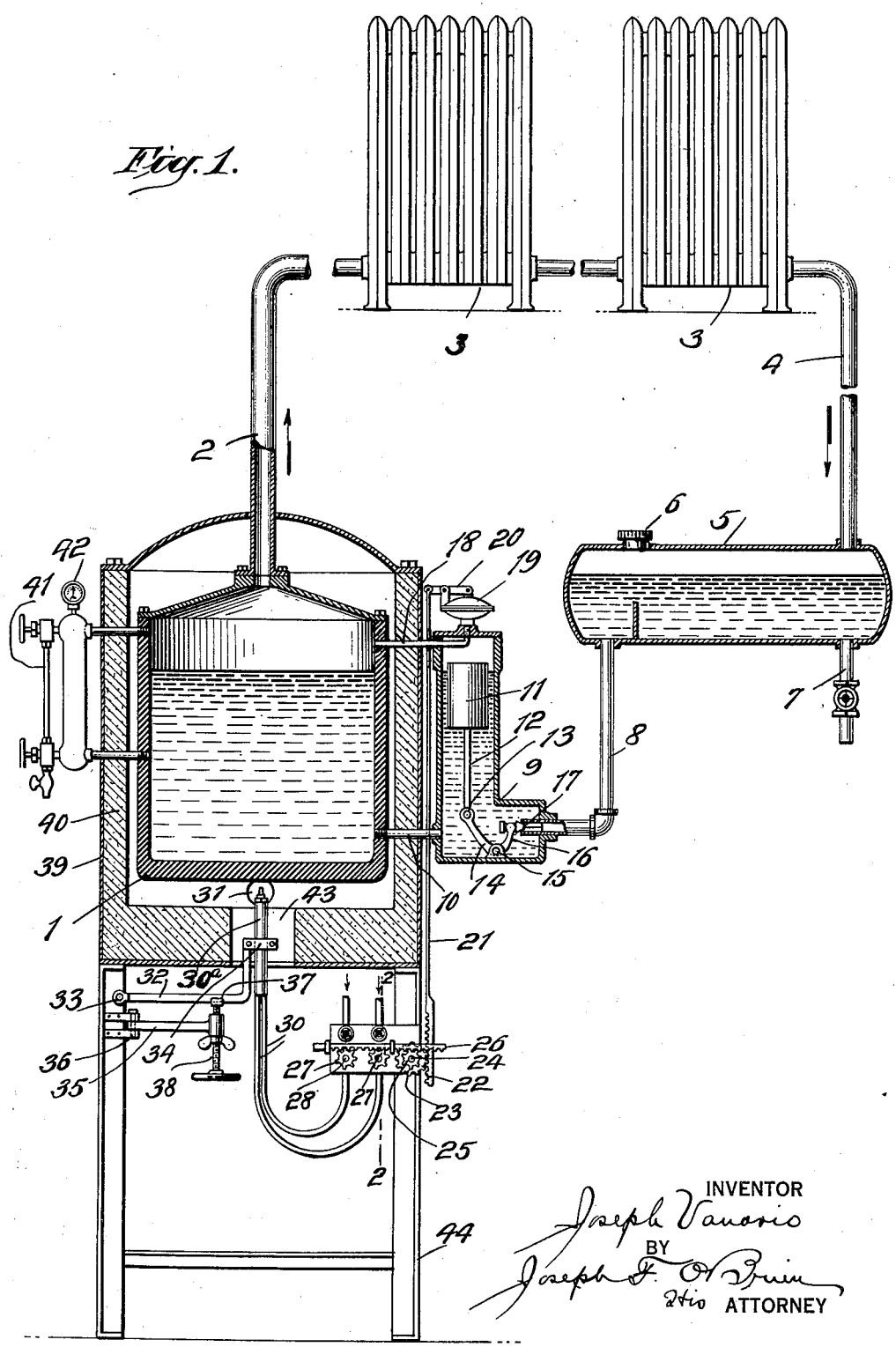

Patented Apr. 21, 1925.

1,535,081

UNITED STATES PATENT OFFICE.

JOSEPH VANORIO, OF COLLEGE POINT, NEW YORK, ASSIGNOR OF ONE-FIFTH TO JOSEPH F. O'BRIEN, OF WEST NEW YORK, NEW JERSEY.

APPARATUS FOR HEATING WATER OR OTHER LIQUIDS.

Application filed May 24, 1919. Serial No. 299,521.

*To all whom it may concern:*

Be it known that I, JOSEPH VANORIO, a citizen of the United States, and a resident of College Point, in the county of Queens and State of New York, have invented certain new and useful Improvements in Apparatus for Heating Water or Other Liquids, of which the following is a specification.

This invention relates to improvements in apparatus for heating water or other liquids.

One object of this invention is to utilize as a fuel acetylene gas and oxygen, preferably in such proportion as to produce an oxy-acetylene flame with a dazzling white portion such as is commonly used in welding, and to take advantage, as a heating element or fuel, of the extremely high degree of heat developed by this portion of the oxy-acetylene flame.

Still another object of my invention is to provide means whereby a maximum amount of the extremely high degree of heat developed in such white jet or portion of the oxy-acetylene flame may be economically transmitted or conducted to water for the purpose of heating the same for use in radiators or for the generation of steam.

Still another object of my invention is to provide suitable means for automatically regulating the supplies of the two fuel constituents according to the quantity of heat required.

More particularly, I have discovered that a boiler or water heater composed of a metal of high heat conductivity such as copper or silver or alloys thereof, when filled with water, may be placed in contact with the white portion of the oxy-acetylene flame produced in a suitable burner, such as a welding torch, without injury to the boiler or heater and that a very large percentage of the extremely high degree of heat developed by such flame will, by bringing such a portion of said flame into actual contact with such a vessel filled with water, be transmitted through such a vessel and be absorbed by the water therein, provided all the water in the bolier is not permitted to be vaporized or converted into steam by the heat, so that a given amount of water may be heated to a given degree of heat with great speed and great economy.

Other objects of my invention will be in part obvious from the annexed drawings and in part indicated in connection therewith by the following analysis of this invention.

This invention accordingly also consists in the features of construction, combinations of parts, and in the unique relationship of the members and in the relative proportioning and disposition thereof, all as more completely outlined in the following specification and in said drawings.

To enable others skilled in the art so fully to comprehend the underlying features of my invention that they may embody the same by numerous modifications in structure and relationship of parts contemplated by this invention, drawings depicting a preferred form have been annexed as a part of this disclosure, and in such drawings like characters of reference denote corresponding parts throughout all the views, of which:—

Fig. 1 is a vertical section partly in elevation of an apparatus embodying my invention, designed to generate steam for heating purposes;

Fig. 2 is a section on the line 2—2 of Fig. 1; and

Fig. 3 is a vertical section partly in elevation of a modified form of device designed for hot water heating.

Referring now to these drawings, 1 indicates a boiler composed of a metal having a high degree of heat conductivity and preferably made of copper, silver or an alloy of these two metals. This boiler 1 may be of any suitable proportions and is suitably connected up by pipe 2 with suitable radiators 3 distributed over the house or other place which it is desired to heat. As illustrated, the radiators have a return pipe 4 communicating with a suitable supply tank or reservoir 5 which may be supplied with water from any suitable source through the opening 6 and, as shown, has a valve-controlled drain pipe 7. The tank 5 in turn communicates by pipe 8 with a supply-regulating device 9, which in turn communicates with the boiler by pipes 10 so that the height of the water within the boiler will be the same as that in the regulator 9. The amount of water supplied to the regulator, therefore, will control the height of the water in the boiler. The regulator 9 is provided with a float valve 11 which is connected at one end to a rod 12 which is connected at its opposite end to one arm 13 of a rocking lever 14 pivoted at 15 within the regulating tank 9, and having an arm 16 cooperating with a valve 17 to supply and shut off water supplied from the tank or reservoir 5 through the pipe 8, the arrangement indicated in the drawing being such that the float valve will, when the tank 9 and boiler 1 is filled with water to the proper height, cause the closure of the valve 17 and when the water in boiler 1 and tank 7 falls below a predetermined height, the valve 17 will be opened to supply additional water. Such an arrangement insures the automatic continuous supplying of a predetermined level of water to the boiler 1 and causes the automatic shutting off of the supply when the water in the boiler has reached such a predetermined level.

30ᵃ indicates an oxy-acetylene burner or torch which is disposed in such relationship to the boiler or tank 1 that the tip of the dazzling white portion of the oxy-acetylene flame will contact with the outer surface of the said boiler. When a boiler of a metal of such high heat conductivity such as copper, silver or an alloy thereof, is so supplied with water the metal of high heat conductivity will, upon the application of the said dazzling white flame thereto, immediately distribute the high degree of heat of such flame over the body of the boiler or a large part thereof without melting the metal and the water in the boiler will immediately absorb such heat so that water in a boiler of this character with such fuel will be heated with great rapidity and with a minimum loss in heat units. Because of the high conductivity of the metal of a boiler of this character, the intense heat of the white portion of said flame, which amounts to approximately 6300 degrees F., will be continuously distributed as aforesaid throughout the body of the metallic tank or boiler, and because of the continuous absorption by the water in the boiler, localization of such heat and melting or cutting of the metal will be prevented.

I also preferably provide automatic means for varying the supply of oxygen and acetylene to the torch so as to increase and reduce the volume of the flame produced thereby, and I preferably regulate the supply by the pressure in the container. As shown in Fig. 1, a pipe 18 leads from the upper part of the boiler to a suitable pressure sensitive device 19 of the usual form which by means of a suitably pivoted lever 20 moves a rod 21, provided at its end with a rack 22. This rack 22 engages a pinion 23 on a spindle 24. This spindle carries another pinion 25 which cooperates with a horizontally disposed rack 26 which engages pinions 27 mounted on valve stems 28 and adapted to move suitable valves 29 (see Fig. 2) to vary and regulate the supply of oxygen and acetylene through the tubes 30 to the torch 20.

In said Fig. 1 the torch 20 is preferably supported in such a position that the dazzling white portion indicated by the circle 31 will contact with the metal of the boiler 1 and this is preferably accomplished, as shown in Fig. 1, by means of a bracket 32 preferably pivoted to swing vertically on pivot 33 and carrying a torch by means of a suitable holder 34. The bracket 32 is preferably supported by means of a bracket arm 35 pivoted in suitable bearings 36 to swing horizontally and having an adjustable supporting cleat 37 which is, as shown, adapted to raise and lower the torch carrying arm 32 by means of a hand actuated screw 38 so that the position of the flame may be adjusted with reference to the bottom of the boiler or container 1. Such adjusting movement is desirable in order to get the dazzling white portion of the oxy-acetylene flame propagated in the torch 20 in contact with the bottom of the boiler, and if desired suitable means may be employed for automatically raising and lowering the torch by a connection to a suitable thermostat or to pressure sensitive means, such as employed for regulating the supply of oxygen and acetylene hereinabove described.

Suitable jacketing means for the boiler is preferably employed and as shown in Fig. 1 the boiler is enclosed in a jacket comprising an outer metallic casing 39 and having a lining 40 of fire clay, asbestos or similar material, and this jacket is provided with a central aperture 43 through which the torch extends. Conventional gauging means and pressure indicating means may also be employed and I have indicated such gauging means by the numeral 41 and such pressure indicating means by the numeral 42.

In Fig. 3 I have indicated a modified form of my invention in which a section of pipe 45 is composed of a metal of high heat conductivity such as copper or silver, and this pipe section is supplied with water in any suitable manner, and is preferably surrounded with a suitable jacket 46 having an aperture 47 through which a torch 48 extends so as to have an oxy-acetylene flame propagated therein to contact with the metal of the pipe section 45. As shown in this figure the torch 48 is connected by means of a holder or strap 49 to a vertically swinging bracket 50 which is pivoted at 51 to the outer end of a stationary arm 52, and the bracket 50 is adjustable by means of a screw 53 and hand wheel 54 to move the torch 48 closer or farther away from the pipe section 45 so as preferably to maintain the dazzling white portion of an oxy-acetylene flame propagated in said torch to contact with the metal section 45 of high heat conductivity.

Suitable means not shown are provided for supplying the water to the system including the pipe section 45 and suitable means are also preferably provided for regulating the volume of oxygen and acetylene so as to very the flame in accordance with the heat of the water within the system, and as shown in this figure, I preferably provide a thermostatic controlling device for regulating and varying the volume of oxygen and acetylene supplied to the torch. The said thermostatic controlling device comprises, as shown, a metallic, and preferably a copper, tube 55 suitably mounted in the liquid of the system. This metallic tube has connected at its inner end in any suitable manner a porcelain rod 56 which projects outwardly through the front end of the tube 55 so that when the liquid in the system heats the copper tube to a predetermined degree the metal thereof will expand to cause the rod 56, which does not expand therewith, to be moved inwardly through its front end an by such movement to actuate a lever 57 which in turn moves a lever 58 connected to a rack 59 which rotates pinions 60 mounted on valve stems 61 in the manner similar to that hereinabove described, the arrangement being such that when the water in the system is heated to a predetermined degree the supply of oxygen through the valves connected to the valve stems 61 will be reduced in volume and when the degree of heat of the water is reduced the thermostatic regulating devices will cause the volume of oxygen and acetylene to be increased and the flame enlarged. A suitable vent 62 is shown for the jacket 46 and pipe sections 63—64—65—66 are, as shown, suitably connected with the section 45, the sections 63 and 64 being connected by the T-piece 67 and the sections 65 and 66 being connected by the T-piece 68, the latter being, as shown, provided with a suitable drain valve 69. This installation would, of course, be suitably connected up with suitable radiators or like heating devices as hereinabove described in relation to Fig. 1.

Having described my invention, I claim:

1. An apparatus for heating water embodying, in combination, a water-heating container composed of a metal of high heat conductivity having a suitable supply of water therein and means for burning oxygen and acetylene to produce an oxy-acetylene flame and positioning the same in contact with the metal of said container.

2. An apparatus for heating water embodying, in combination, a water-heating container composed of a metal of high heat conductivity, having a suitable supply of water therein and means for burning oxygen and acetylene in such quantities as to produce an oxy-acetylene flame having a dazzling white portion and means for supporting said burning means in a position in which said dazzling white portion will be in contact with the metal of said container.

3. An apparatus for heating water embodying, in combination, a water-heating container composed of a metal of high heat conductivity, a burning element for oxygen and acetylene arranged to produce an oxy-acetylene flame and to position the white portion of such flames in contact with the said metal and means for automatically supplying water to said heating container to keep the same in a liquid state.

4. An apparatus for heating water embodying, in combination, a water-heating container composed of copper and containing water in a liquid state, and a torch propagating a gas flame with a degree of heat above the melting point of the said metal arranged in such a position in relation to said container as to direct said gas flame against the metal of said container.

In witness whereof, I have signed my name to the foregoing specification in the presence of two subscribing witnesses.

JOSEPH VANORIO.

Witnesses:
ARCHIBALD L. VANNESS,
HELEN V. WHIDDEN.